Nov. 19, 1935.  G. A. LYON  2,021,369
ORNAMENTAL BAND
Filed Aug. 19, 1933
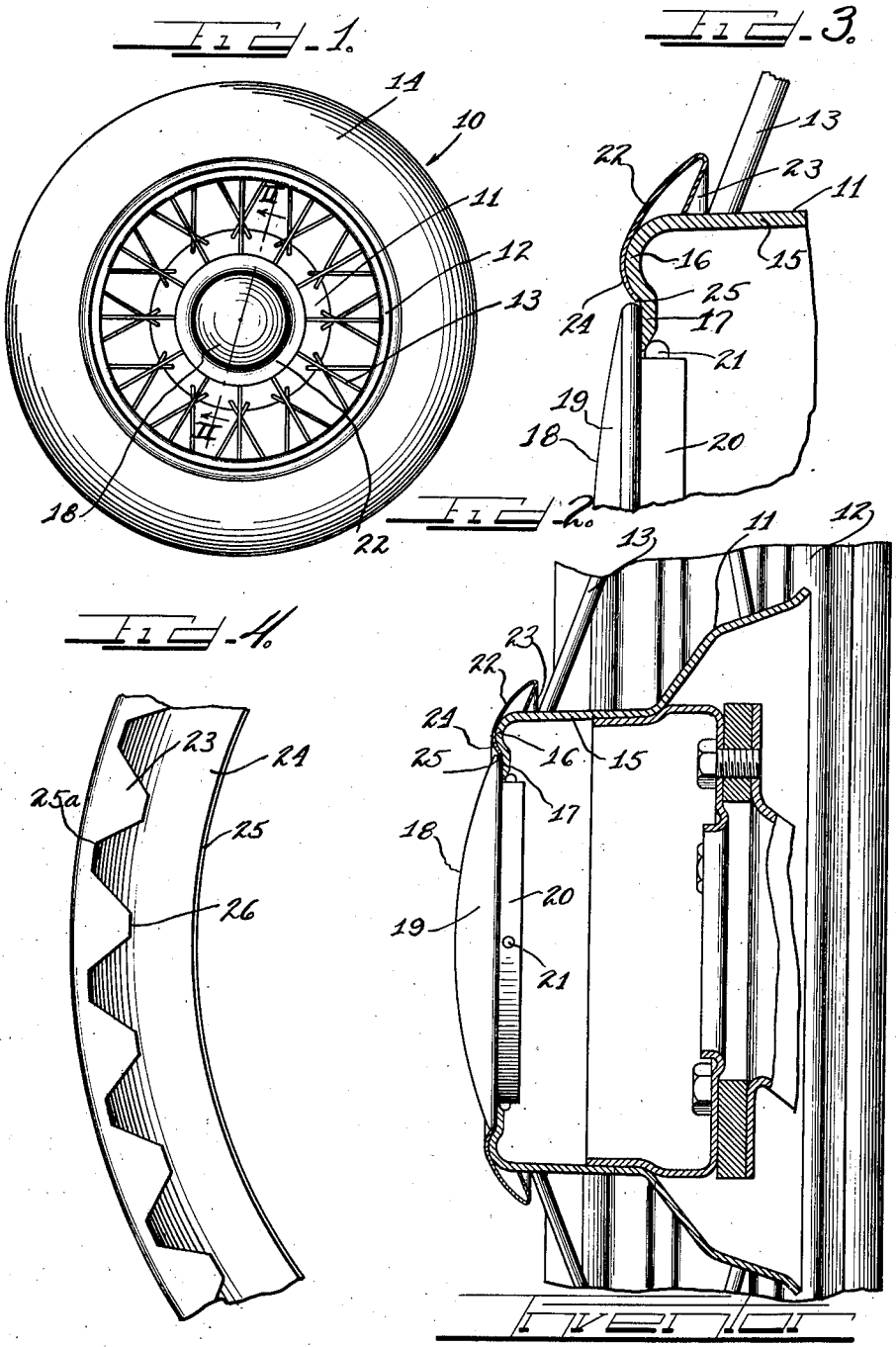
George Albert Lyon.

Patented Nov. 19, 1935

2,021,369

UNITED STATES PATENT OFFICE 2,021,369

ORNAMENTAL BAND

George Albert Lyon, Detroit, Mich.

Application August 19, 1933, Serial No. 685,835

5 Claims. (Cl. 41—10)

This invention relates to means for ornamenting objects preferably having a curved or arcuate surface, and while the preferred form of the invention has been described herein as embodied in an automobile hub of the type used for wire wheels, the invention is not to be limited to this particular application as it may be incorporated with equal facility in other devices.

Since the hub of an automobile wheel at the end thereof which receives the ornamental hub cap projects beyond the plane of the rim of the wheel, this portion of the hub is subjected to the action of sand and stones thrown by the wheels and may consequently become marred and thus detract from the appearance of the wheel. Moreover, the projecting end of the hub by being thus exposed is apt to have its finish scraped or otherwise damaged by the hub scraping against the curb or by coming in contact with other cars or objects.

It is therefore an important object of this invention to provide an improved ornamental band or ring of such construction that it may be used not only as an ornamenting means for any device having a curved or arcuate surface, but may also be used as a clamping member to secure other members in place on the device.

It is a further object of this invention to overcome the disadvantages of the prior art constructions mentioned above in connection with wheel hubs and to provide improved means for ornamenting the wheel hub.

It is a further object of the invention to provide a replaceable ornamental ring for wheel hubs, which ring is of simple construction, has a highly attractive appearance and may be quickly applied and secured in position.

Another object of the invention is the provision of such a ring in combination with a wheel hub, this ring being so constructed as to automatically adjust itself when applied to the hub to ordinary variations in dimensions of hubs of the same stock size.

In accordance with the general features of the invention, there is provided an ornamental ring of curved cross-section and including an underturned portion having a plurality of teeth for biting into an associated surface of an automobile hub or other device over which the band or ring is disposed; the underturned portion and its teeth being concealed by an outer curved marginal portion of the ring so positioned with respect to the underturned portion as to not interfere with the free movement of the teeth of the underturned portion, when the teeth are moved into biting engagement with the associated surface.

Other objects and features of this invention will more fully appear from the following detailed description, taken in connection with the accompanying drawing which illustrates several embodiments and uses thereof, and in which:

Figure 1 is a view in elevation showing an automobile wheel including a hub incorporating my invention;

Figure 2 is an enlarged fragmentary cross-sectional view of the hub portion of the wheel assemblage shown in Fig. 1, taken substantially on line II—II thereof;

Figure 3 is a further enlarged fragmentary sectional view to more clearly illustrate the manner in which the ornamental ring is secured to the hub; and Figure 4 is an enlarged fragmentary rear view of a portion of the ornamenting ring showing the hub engaging teeth thereof.

As shown on the drawing:

My present invention is illustrated in Figures 1, 2 and 3 as being incorporated in the hub of a wire wheel for an automobile, this wheel being generally designated by numeral 10. The wheel comprises a hub portion 11, a rim 12, and a plurality of wire spokes 13 which interconnect the hub and rim portions in the conventional manner. The wheel as in operation is normally fitted with a tire 14 held in place by frictional engagement with the rim 12.

The hub portion 11 of the wheel comprises a tubular shaped casing 15 which serves as a base for the inner ends of the wheel spokes, the spokes being secured thereto in any suitable manner, as by riveting or welding. The outer end of the casing 15 is deflected to form an annular bead 16 which terminates at its inner edge so as to form an annular recessed seating flange 17 for the hub cap 18.

The hub cap 18 is of the usual construction comprising an ornamental disc or plate 19 which is provided with a collar 20 on its rear surface of suitable circumference to enable the collar to be inserted in the opening defined by the seating flange 17. Moreover, this collar has mounted thereon a plurality of spring actuated pins or detents 21 which engage the rear side of the flange 17 and cooperate with the rear surface of the disc 19, which is seated on the flange 17, to hold the hub cap in position in the end of the hub.

The improved ornamenting band or ring comprises a strip of relatively thin resilient material including an outwardly arched intermediate portion 22 which connects two lateral marginal portions 23 and 24. The marginal portion 23 is relatively long and has cut away portions 25ᵃ providing resilient or yieldable spaced teeth or lugs 26 which engage at their inner ends the outer surface of the base or casing 15 or other surface to which it may be applied for holding the ornamental band in position as best shown in Figure 3. The marginal portion 23 extends inwardly and is laterally inclined in an opposite direction from the marginal portion 24. This latter marginal portion is relatively short as compared with the marginal portion 23 and extends inwardly from the arched portion 22 to form a continuation thereof having a curvature substantially that of the curvature of the outer surface of the bead 16 of the hub. The inner edge 25 of the ornamental band is, when mounted on the hub casing, disposed at the juncture of the bead 16 and the annular seating flange 17, in which position it lies contiguous the outer periphery of the disc 19 of the hub cap. The teeth or lugs 26 being resilient are adapted to accommodate themselves to any slight manufacturing irregularities on the surface of the hub casing 15.

The ornamenting band embodied in this invention may be formed of stainless steel or other suitable material to provide the necessary inherent resiliency for the purpose set forth. Moreover, this band may be provided with any suitable decorative matter, such, for example, as a chromium plating on its outer surface so as to enhance the appearance of the hub to which it is applied.

From the foregoing description it will be readily understood that the ornamenting ring may be quickly applied to the wheel hub by simply pressing the same axially over the casing 15 and thereby forcing the longitudinally spaced teeth or lugs 26 into tight engagement with the outer surface of the casing. As the ring is forced into position, the marginal portion 24 engages the bead 16 and the inner edge 25 assumes a position at the juncture of the bead 16 and seating flange 17. Due to the fact that this ring is constructed so that the circumference of the inner ends of the teeth is slightly less than the circumference of the hub casing 15, the teeth 26 will be flexed when the ring is inserted on the hub and will bite into the outer surface of the hub. The arched portion 22 will also be flexed a certain amount so that the ring is securely retained on the end of the hub, and, since the arched portion 22 and the marginal portions extend over a substantial portion of the end of the hub casing 15 and the bead 16, the appearance of the wheel hub as a whole will be greatly improved. Although the previously described ornamenting ring is of a relatively permanent nature, it may be readily removed and replaced when it has been damaged or its appearance has become undesirable, and a new ring installed to revive the appearance of the hub portion of the wheel.

The fingers or teeth 26 are resilient and extend diagonally rearward from the outer surface of the casing or hub part 15 engaged thereby so that any tendency to dislodge the fingers or teeth from that surface only enhances their gripping engagement of the surface of part 15.

Now it is of course to be understood that, although I have described in detail an embodiment of my invention, the invention is not to be thus limited but only insofar as defined by the scope and spirit of the appended claims.

I claim as my invention:

1. In combination with a wheel including a hub part, a circular ornamental member for disposition over an outer side of the wheel and having means for retaining cooperation with an outer surface of said hub part, said means including a plurality of fingers projecting diagonally rearward and outward from the surface of said hub part engaged thereby.

2. In combination with a wheel including a hub part, a circular ornamental member for disposition over an outer side of the wheel and having means for retaining cooperation with an outer surface of said hub part, said means including a plurality of fingers projecting diagonally rearward and outward from the surface of said hub part engaged thereby, such fingers being yieldable and being arranged so that their tips are disposed in a circle which normally has a diameter slightly less than that of said surface engaged thereby.

3. In combination with a wheel including a hub part, a circular ornamental member for disposition over an outer side of the wheel and having means for retaining cooperation with an outer surface of said hub part, said means including a plurality of fingers projecting diagonally rearward and outward from the surface of said hub part engaged thereby, said fingers being resilient and so arranged that any tendency to dislodge them from said hub part enhances their engagement of the hub part.

4. In combination with a wheel including a hub part, a circular ornamental member for disposition over an outer side of the wheel and having means for retaining cooperation with an outer surface of said hub part, said means including a plurality of fingers projecting rearwardly at such an angle to and outwardly from the surface engaged thereby that they are easy to apply to said surface but are difficult to remove, and so that any tendency to dislodge them from said surface enhances their gripping engagement of the same.

5. In combination with a wheel including a hub part, a circular ornamental member for disposition over an outer side of the wheel and having means for retaining cooperation with an outer surface of said hub part, said means including a plurality of fingers projecting rearwardly at such an angle to and outwardly from the surface engaged thereby that they are easy to apply to said surface but are difficult to remove, and so that any tendency to dislodge them from said surface enhances their gripping engagement of the same, said fingers being concealed by an external portion of said member, but being resiliently connected to said portion so as to readily adjust themselves to said surface.

GEORGE ALBERT LYON.